United States Patent
Bryant, III

[11] Patent Number: 6,142,483
[45] Date of Patent: Nov. 7, 2000

[54] GASKET ASSEMBLY FOR SEALING MATING SURFACES

[75] Inventor: Melvin A. Bryant, III, Decatur, Ala.

[73] Assignee: The United States of America as represented by the Administrator of the National Aeronautics and Space Administration, Washington, D.C.

[21] Appl. No.: 09/160,205

[22] Filed: Sep. 21, 1998

[51] Int. Cl.[7] ................................................ F16J 15/02
[52] U.S. Cl. ...................... 277/598; 277/609; 277/627; 277/630; 277/654; 277/919; 277/922; 277/930; 277/933; 277/940; 277/944
[58] Field of Search .................... 277/316, 592, 277/598, 609, 627, 630, 653, 654, 919, 922, 930, 933, 940, 944; 219/76.17, 78.01, 85.1, 544, 546, 547; 285/21.1, 21.2

[56] References Cited

U.S. PATENT DOCUMENTS

| | | |
|---|---|---|
| 3,693,448 | 9/1972 | Seltzer . |
| 3,897,087 | 7/1975 | Neilson . |
| 4,313,053 | 1/1982 | Sturm . |
| 4,415,187 | 11/1983 | Hudson, Jr. . |
| 4,507,907 | 4/1985 | Wolfson . |
| 4,560,084 | 12/1985 | Wolfson . |
| 4,718,698 | 1/1988 | Hill . |
| 4,851,647 | 7/1989 | Kuhling . |
| 4,906,313 | 3/1990 | Hill . |
| 5,156,420 | 10/1992 | Bokor et al. . |
| 5,320,697 | 6/1994 | Hegler et al. . |
| 5,620,208 | 4/1997 | Kirkham . |

FOREIGN PATENT DOCUMENTS

| | | |
|---|---|---|
| 402011997 | 1/1990 | Japan . |
| 405263983 | 10/1993 | Japan . |

OTHER PUBLICATIONS

Metal Gasket Bonded by Electrical Heating; NASA *Tech Briefs*; Mar. 1998; p. 72; vol. 22, No. 3; Associated Business Publications NY, NY.

Primary Examiner—Anthony Knight
Assistant Examiner—John L. Beres
Attorney, Agent, or Firm—Robert L. Broad, Jr.

[57] ABSTRACT

A gasket assembly for securing a pair of surfaces together wherein an electrically conductive gasket base having a central opening is provided with a pair of layers secured to opposite sides of the gasket base, with the layers being a fusible alloy, a brazing alloy or a synthetic, thermoplastic material which will melt, without degrading, when the gasket base is heated. The surfaces may be secured to each other by a plurality of bolts to squeeze the gasket assembly therebetween or by some other clamping means. An electrical current is passed through the gasket base to heat it to a temperature sufficient to melt the layers to seal the surfaces to opposite sides of the gasket base.

5 Claims, 1 Drawing Sheet

GASKET ASSEMBLY FOR SEALING MATING SURFACES

ORIGIN OF THE INVENTION

This invention was made by an employee of the United States Government and may be manufactured and used by or for the Government for governmental purposes without the payment of any royalties.

BACKGROUND OF THE INVENTION

1. Field of the Invention

This invention relates to gaskets.

2. Background Information

Gaskets are widely used to prevent leaks from joints. Frequently, gaskets deteriorate with age and at some point begin to leak. Also, some fluids corrode some gasket materials, resulting in leaks. Some gaskets, such as those used to seal rocker arm covers to an automotive engines, tend to lose resiliency and shrink with age, allowing engine oil to leak out onto the engine. Some types of gaskets must be tightened periodically to avoid leaks. Welding a joint would probably be a method of achieving a joint which does not leak, even after the passage of time. However, welding a joint to prevent leaks is usually not feasible, since almost all joints have portions which are inaccessible.

SUMMARY OF THE INVENTION

Figure 1:
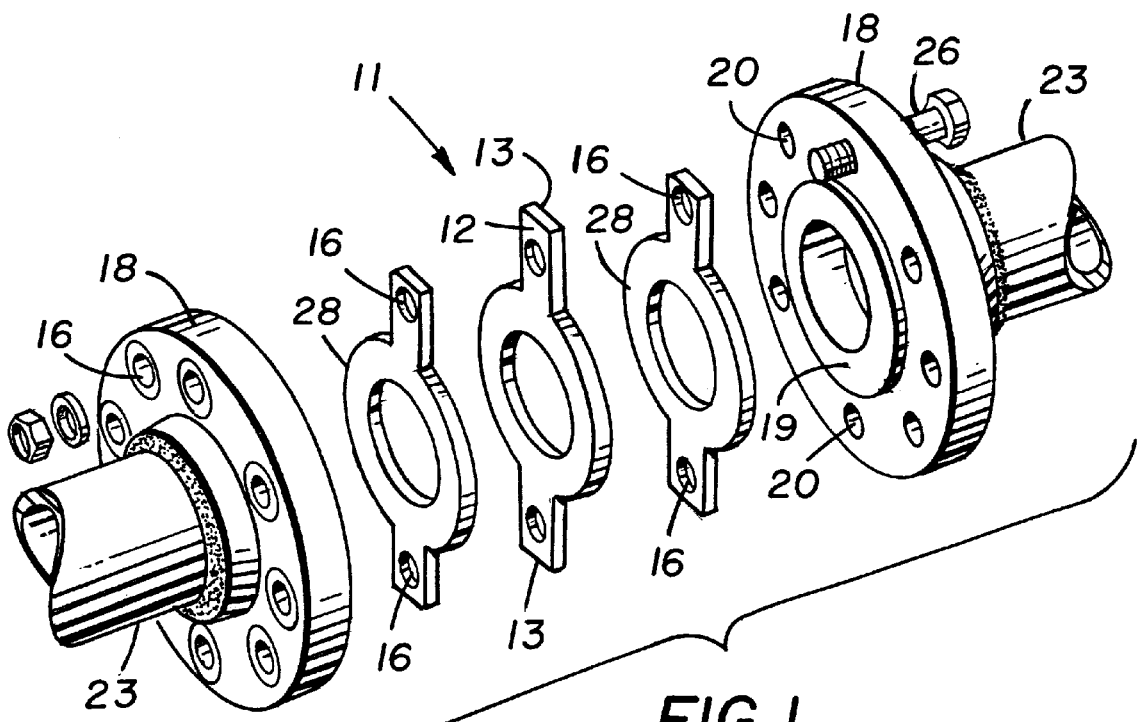
FIG. 1 is an exploded perspective view of the apparatus of this invention showing the arrangement of the various parts making up the apparatus.

A gasket assembly for sealing a pair of mating surfaces to each other, said assembly having a generally flat, electrically conductive gasket base having positioned on opposite sides thereof a pair of rings or layers of an element selected from the group consisting of fusible alloys, synthetic, thermoplastic materials and brazing alloys The rings or layers, which are preferably made of a material which will wet the surfaces when melted, may be attached to the gasket base by the use of a thermoplastic synthetic material, by a fusible alloy applied at points around the gasket base or by some mechanical means. However, it is preferred that these layers be coated onto the gasket base. In use, the gasket assembly is positioned between the two surfaces to be sealed to each other and the surfaces are held in close contact with the gasket assembly. An electrical current is then passed through the gasket base to heat the gasket base and melt the layers to cause the surfaces to seal to opposite sides of the gasket base.

DETAILED DESCRIPTION OF THE INVENTION

Referring now in detail to the drawings, there is shown a gasket assembly 11 made up of a gasket base 12 having a pair of opposed tabs 13 which serve as electrical connections. The purpose of the gasket assembly is to seal a pair of surfaces 19 to each other, the surfaces in the embodiment shown being a part of flanges 18 secured to pipes 23 and having a plurality of bolt holes 20 arranged in a circle. In this embodiment, bolts 26 extend through the bolt holes 20 to secure the flanges 18 to each other with the gasket assembly sandwiched therebetween.

The gasket base 12 is preferably made of steel, most preferably mild steel, or some other electrically conductive material which can be heated by passing an electric current through it. Positioned on opposite sides of the gasket base are rings or, preferably, layers 28 of a material which will melt and seal the flanges to the gasket base when the gasket base is heated by passing an electrical current through it. Preferably, the rings or layers 28 are in the form of thin films coated onto opposite sides of the gasket base.

While mild steel is the most preferred material for the gasket base 12 other materials can be used. The material used should have a sufficiently high electrical resistance that it is not necessary to pass unduly large currents of electricity through it to melt the layers 28. Also, the gasket base should not be so thick that an unduly large current is required to heat it sufficiently to melt the layers 28.

Some resistive materials other than steel are:

| Alloy | Composition % by weight | Ohms/circular mil-ft at 20° C. |
|---|---|---|
| A | Cu: 55; Ni: 45 | 294 |
| B | Ni: 30; Cr: 5; Fe: 65 | 570 |
| C | Cu; Sn | 25 |
| D | Ni: 50; Fe: 50 | 120 |
| E | Ni: 95.5; Mn: 4.5 | 120 |
| F | Cu: 84; Mn: 12; Ni: 4 | 290 |
| G | Ni; Cu | 256 |
| H | Ni: 60; Fe: 25; Cr: 15 | 675 |
| I | Ni: 80; Cr: 20 | 650 |

Figure 2:
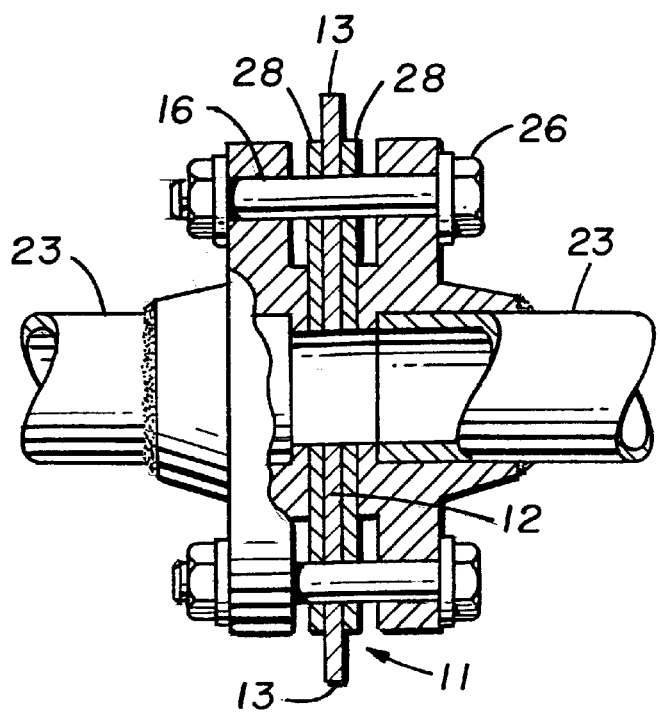
FIG. 2 is a cross sectional view of the gasket assembly showing the manner in which in which the gasket base is sandwiched between the sealing layers.

In FIG. 1, a preferred embodiment, the ring 28 is shown as a thin layer of material to be secured to the gasket base. In FIG. 2, the ring 28 is shown as layers of solder adhered to opposite sides of the gasket base. The solder ring may also be attached to the gasket base by the use of a synthetic, thermoplastic material ("hot melt" adhesive, etc.) or by a fusible alloy applied at several points around the ring. However, it is preferable that the layer 28 be adhered to the gasket base as a thin layer.

The ring or layer 28 may be made of a material selected from the group consisting of fusible alloys, synthetic, thermoplastic materials and brazing alloys. Fusible alloys are those alloys which will melt at temperatures below about 250° C. Fusible alloys are usually binary, ternary, quaternary or quinary mixtures of bismuth, lead, tin, cadmium, indium and less frequently other metals. The term "low melting temperature" means a temperature below about 250° C. "Non-degradable" thermoplastic materials are those thermoplastic materials which will melt and which do not degrade when melted. For higher temperature applications the layers 28 may be brazing alloys. Brazing alloys are well known to those skilled in the art of brazing.

Some of the fusible alloys are:

| | EUTECTIC ALLOYS | | | | |
|---|---|---|---|---|---|
| | Percentage Composition | | | | |
| Melting Temp. ° C. | Bi | Pb | Sn | Cd | Other |
| 248.0 | 0 | 82 | 0 | 18 | 0 |
| 221.0 | 0 | 0 | 96 | 0 | Ag 4 |
| 199.0 | 0 | 0 | 91 | 0 | Zn 9 |
| 183.0 | 0 | 38 | 62 | 0 | 0 |
| 144.0 | 60 | 0 | 0 | 40 | 0 |
| 143.0 | 0 | 31 | 51 | 18 | 0 |
| 138.56[1] | 58 | 0 | 42 | 0 | 0 |
| 138.5 | 57 | 0 | 43 | 0 | 0 |
| 130.0 | 56 | 0 | 40 | 0 | Zn 4 |

-continued

| | | | | | |
|---|---|---|---|---|---|
| 124.3[2] | 55.5 | 44.5 | 0 | 0 | 0 |
| 102.5 | 54 | 0 | 26 | 20 | 0 |
| 95.5 | 52 | 37 | 16 | 0 | 0 |
| 91.5 | 52 | 40 | 0 | 8 | 0 |
| 78.8 | 57 | 17 | 0 | 26 | 0 |
| 70.0[3] | 50 | 26.7 | 13.3 | 10 | 0 |
| 70.0[4] | 50 | 27 | 13 | 10 | 0 |
| 58.0[5] | 49 | 18 | 12 | 0 | In 2 |
| 46.9[6] | 44.7 | 22.6 | 8.3 | 5.3 | In 19.1 |

NON-EUTECTIC ALLOYS

| Yield Temp. | Melt Range, | Percentage Composition | | | |
|---|---|---|---|---|---|
| °C. | °C. | Bi | Pb | Sn | Other |
| 159 | 145–176 | 12.6 | 47.5 | 39.9 | 0 |
| 154 | 143–163 | 14 | 43 | 43 | 0 |
| 145 | 130–173 | 20 | 50 | 30 | 0 |
| 142 | 120–152 | 21 | 42 | 37 | 0 |
| 135 | 129–132 | 5 | 32 | 45 | Cd 18 |
| 127 | 124–130 | 56 | 2 | 40.9 | In 0.4 Cd 0.7 |
| 116 | 103–227 | 48 | 28.5 | 14.5 | Sb 9 |
| 111 | 95–143 | 33.3 | 33.4 | 33.3 | 0 |
| 100 | 95–114 | 59.4 | 14.8 | 25.8 | 0 |
| 96 | 95–104 | 56 | 22 | 22 | 0 |
| 89 | 83–92 | 52 | 31.7 | 15.3 | Cd 1.0 |
| 72.5 | 70–90 | 42.5 | 37.7 | 11.3 | Cd 8.5 |
| 64.0 | 61–65 | 48 | 25.6 | 12.8 | Cd 9.6 In 4.0 |

Common Fusible Alloys

| Material | Approx. M.P. °C. | Bi | Pb | Sn | Cd |
|---|---|---|---|---|---|
| Material A | 138.6 | 58 | 0 | 42 | 0 |
| Material B | 123.8 | 55.5 | 44.5 | 0 | 0 |
| Material C | 100 | 50 | 28 | 22 | 0 |
| Material D | 95 | 50 | 31 | 19 | 0 |
| Material E | 93 | 50 | 25 | 25 | 0 |
| Material F | 71 | 50 | 24 | 14 | 12 |
| Material G | 71 | 50 | 25 | 12.5 | 12.5 |
| Material H | 70 | 50 | 27 | 13 | 10 |
| Material I | 70 | 50 | 26.7 | 13.3 | 10 |

[1]Cerrotru;
[2]Cerrobase;
[3]Cerrobend;
[4]Lipowitz's metal;
[5]Cerrolow-136;
[6]Cerrolow-117

Synthetic, thermoplastic materials usable in this invention are those materials which will melt, without degrading, at temperatures below about 250° C. and will, preferably, wet the surfaces to be sealed to opposite sides of the gasket base. Such materials include hot melt adhesives, nylon, polyethylene and other plastics that are well known to those skilled in the art. It can readily be seen that the layers may be of different materials. For example, the layer 28 on one side of the gasket base may be a fusible alloy while the layer on the other side may be a synthetic, thermoplastic material. It is preferable that the layers on opposite sides of the gasket base melt at about the same temperature range. An example of a high temperature application for this thermal seal is to braze-join lightweight components to each other using a mild steel gasket base about 60 mils thick coated with a braze alloy which melts at about 1,125° F. with a braze flux type B-1 (1,000– 1,700° F.). This application is particularly suited to vacuum systems, catalytic converters and refrigeration systems.

There are many brazing alloys. Some of the most common are:

| | Composition | | | | | |
|---|---|---|---|---|---|---|
| Composition A | Cu | Ag | Zn | Cd | P | Melting Range, °C. |
| Composition B | 99+ | | | | | 1083 |
| Composition C | 50 | 50 | | | | 778–850 |
| Composition D | 15.5 | 50 | 16.5 | 18 | | 627–734 |
| Composition E | 93 | | | | 7 | 704–800 |
| Composition F | 28 | 72 | | | | 778 |
| Composition G | 34 | 50 | 16 | | | 695–775 |

Various brazing fluxes may be used with these brazing alloys. Those skilled in the art of brazing will be familiar with brazing alloys and the brazing fluxes which will work best with each alloy. The brazing flux may be brushed onto the brazing alloy and protected by a thin layer of paper or plastic until the gasket is to be used. Or, the flux may be brushed onto the brazing alloy at the point of use.

It is preferred that the rings 28 be in the form of thin layers which have been applied to the gasket base 12 by coating the layer in molten form onto the gasket base (as by tinning). This allows for a maximum heat transfer from the gasket base 12 to the layers 28. Also, when the layers are so applied to the gasket base the exposed surfaces of the layers will be smoother and flatter. This allows a maximum heat transfer from the gasket base through the layers to the surfaces 19 to be joined.

Preferably, there must be sufficient heat transferred through the layers 28 to heat the surfaces 19 to a temperature equal to or above the melting point of the layers 28. The gasket will work if the layers 28 are heated sufficiently to soften and conform to the surfaces 19 to be joined. However, it is much preferred that the layers 28 be heated to the melting point and that the layers will wet the surfaces 19 when molten.

This joining process is more successful then others for the reason that the heat is applied directly to the surfaces 19 rather than to some other part of the flange or whatever the surfaces 19 are part of. Where the entire flange is heated to get the temperature of the surfaces 19 up to the melting point of the layers 28, much more time and energy is required. Also, the joining is not completed until the surfaces 19 and the layers 28 are cooled to a temperature below the melting point of the layers 28. This means that the joint cannot be moved until this lower temperature is reached. In fact, the joint will, unless the flanges are clamped together by some mechanical means, probably be too hot to touch until it cools off. By using the process of this invention, some joints can be completed before the flanges 18 even get warm.

In operation, the gasket assembly is positioned between two surfaces to be secured together and a clamping force urges the surfaces 19 toward each other. The clamping force may be applied by a spring loaded clamp (not shown) or by the bolts 26. An electrical current is then passed through the gasket base to melt the layers on opposite sides of the gasket base. If bolts are used to hold the surfaces 19 together, the bolts are tightened while the layers 28 are in a molten state to urge the surfaces 19 toward the gasket base. If spring loaded clamps are used to urge the surfaces 19 toward each other it will not be necessary to use bolts. The electrical current is stopped and the layers 28 solidify and seal the surfaces to opposite sides of the gasket base. This, in effect, gives a welded joint without the problems which may be faced in attempting to actually weld the joint. This gasket assembly is useful, for example, in the automotive industry for sealing the rocker arm covers to the head; for sealing the cylinder heads to the engine block and for sealing the thermostat housing to the head. It is also useful for sealing catalytic converter shells to each other. In this latter case, where the joint is to be subjected to high temperatures, the layers 28 would be made of a braze alloy.

To separate the surfaces 19 after the gasket assembly has been installed, an electrical current is applied to the gasket base to heat it and melt the layers 28. The surfaces can then be separated.

What is claimed is:

1. A gasket assembly for sealing a pair of mating surfaces to each other, comprising:
   (a) A generally flat, electrically-conductive gasket base; and
   (b) A pair of elements secured to opposite sides of the gasket base, one of the elements being a synthetic thermoplastic material and the other being a fusible alloy, the elements having a melting temperature such that when the gasket assembly is positioned between the mating surfaces and an electrical current is passed through the gasket base, the elements soften to conform to the mating surfaces, sealing the mating surfaces to opposite sides of the gasket base, the elements being capable of wetting the mating surfaces when in a molten state.

2. The apparatus of claim 1 wherein the gasket base is made from a material selected from the group consisting of steel; mild steel, tungsten, alloy A, alloy B, alloy C, alloy D, alloy E, alloy F, alloy G, alloy H, and alloy I.

3. The apparatus of claim 1 wherein the synthetic thermoplastic material is polyethylene.

4. The apparatus of claim 1 wherein the gasket base is provided with electrical connections.

5. The apparatus of claim 1 wherein the fusible alloy is selected from the group consisting of Material A, Material B, Material C, Material D, Material E, Material F, Material G, Material H, and Material I.

* * * * *